Patented July 7, 1936

2,046,937

UNITED STATES PATENT OFFICE 2,046,937

PROCESS FOR THE PREPARATION OF COPPER COMPOUNDS FROM METALLIC COPPER

Leo P. Curtin, Cranbury, N. J.

No Drawing. Application August 11, 1933, Serial No. 684,769

10 Claims. (Cl. 23—55)

The object of the present invention is to provide an improved process for the conversion of metallic copper in any form such as scrap copper and cement copper into useful copper compounds, both cuprous and cupric.

Many methods have been proposed for the conversion of metallic copper into cuprous compounds and for the oxidation of cuprous compounds into cupric compounds. For example, metallic copper has been converted into cuprous chloride by contacting it with oxygen in the presence of hydrochloric acid and by dissolving it in a solution of cupric chloride. In carrying out the latter process the relatively insoluble cuprous chloride formed deposits on the copper being dissolved thereby greatly retarding the action of the cupric chloride and making it very difficult to secure a complete reduction or utilization of the cupric chloride. The action of the cupric chloride on the copper, of course, becomes slower and slower as the copper becomes coated with the cuprous chloride and as the concentration of cupric chloride in the dissolving solution diminishes.

Cuprous chloride is highly insoluble in water, but is relatively soluble in solutions of certain other chlorides, including hydrochloric acid. For example, a hot saturated solution of sodium chloride will dissolve about 16% by weight of cuprous chloride. Potassium chloride, magnesium chloride, calcium chloride, zinc chloride and ammonium chloride exhibit a similar dissolving effect, the solubility of cuprous chloride in ammonium chloride solution being greater than in sodium chloride solution or calcium chloride solution. The solubility of cuprous chloride in solutions of other chlorides is attributed to the formation of a complex cuprochloride ion or to the formation of a double salt such as ammonium cuprochloride which is soluble.

Now I have found that the oxidation of copper by means of cupric chloride is greatly accelerated by the presence of another soluble chloride, such as those of sodium, potassium, ammonium, magnesium, zinc and calcium, in the solution. When sodium chloride is present, particularly in a strong hot solution, the reaction proceeds quite rapidly, but even so it is quite difficult to force the reaction to completion, i. e. to consume all of the cupric chloride present in the dissolving solution. If, however, ammonium chloride is present in the cupric chloride solution, the reaction proceeds with great velocity to completion. A hot solution of cupric chloride, saturated with ammonium chloride, generally will exhaust itself so that there is not more than a trace of cupric chloride left in the solution in 15 minutes or less. It is estimated that the oxidation of copper by means of cupric chloride in the presence of ammonium chloride is more than 50 times as rapid as when a cupric chloride solution of the same concentration and temperature without the ammonium chloride is used.

In the oxidation of copper by means of cupric chloride is the presence of another soluble chloride such as ammonium chloride, not only does the oxidation proceed rapidly and to completion, but the cuprous chloride formed dissolves, making it unnecessary to carry out any further operation for the separation of the formed cuprous chloride from any residual metallic copper, such as by dissolving the cuprous chloride in a solution of another chloride, or mechanically separating the cuprous chloride in solid form from the copper.

An example of an oxidizing solution suitable for commercial operation in accordance with the foregoing disclosure is a water solution containing 25% by weight of ammonium chloride and 8 to 10% by weight of cupric chloride dihydrate.

In the process above described of dissolving copper in a solution of cupric chloride containing another soluble chloride, such as ammonium chloride, an interesting series of color changes occurs. Before contact with the copper the cupric chloride solution is of a deep green color. Immediately after contact with the copper it changes to an opaque brownish black color due to the formation of a cupro-cupric complex. As the reaction progresses the color changes to brown, brownish yellow, and finally to a pale transparent yellow when the last trace of cupric ion has been consumed or reduced. If a little free acid is present the final solution may be water white or nearly so.

If cuprous compounds are the desired product they may be prepared directly from the solution used to dissolve the copper. For example, the ammonium cupro-chloride solution, produced as described above, upon cooling will deposit a considerable portion of its cuprous chloride content which may be recovered in the pure state by filtration and washing with dilute hydrochloric acid.

Cuprous oxide may be obtained directly from the solution by the addition of a base, such as sodium hydroxid or carbonate. This is a quantitative reaction and it is undesirable to use more than about 1% excess of the base. The orange precipitate formed on the addition of the base is digested with water for several hours under the exclusion of air, filtered and dried at moderate temperature, and finally dehydrated at 300° C.

Cuprous cyanide may be prepared by interaction between a soluble cyanide and the ammonium cuprochloride solution. I prefer to add an excess of 1% of the cuprochloride solution to a solution of a soluble cyanide such as sodium cyanide. The precipitation of the cuprous cyanide is quantitative.

I have further found that cupric compounds may be economically prepared by oxidation of cuprous copper of the ammonium cuprochloride solution. Atmospheric air generally is most satisfactory for this purpose. The operation is very simple and easily carried out as compared with oxidation of cuprous chloride alone, which on account of its insolubility must be treated in suspension in a liquid such as water and the oxidation is slow and incomplete. The atmospheric oxidation of a sodium cuprochloride solution has been disclosed in my Patent No. 1,620,152, dated March 8, 1927, but so far as I am aware, this reaction never has been employed for the preparation of pure cupric compounds as such. The air oxidation of the cuprous ion in the presence of ammonium chloride is moreover so much more rapid than the oxidation of the cuprous ion in the presence of sodium chloride as to provide, from a commercial and economical standpoint, a new process for the production of cupric compounds. Ammonium chloride has a strong catalytic effect not exerted by the other soluble chlorides.

For performing the oxidation I prefer to inject air into the ammonium cuprochloride solution through a filter plate or similar device in order to secure intimate contact between the air and the solution.

In the air oxidation of the ammonium cuprochloride solution, the color changes are in the reverse order of those described above in connection with the dissolving of metallic copper in cupric chloride solution. When the solution under oxidation becomes a clear green color, the oxidation is complete and the last trace of cuprous ion has been destroyed or consumed.

The reactions involved are as follows:

(1) $Cu + CuCl_2 + 2NH_4Cl \rightarrow 2NH_4CuCl_2$
(2) $6NH_4CuCl_2 + O + H_2O \rightarrow$
    $6NH_4Cl + 2CuCl_2 + Cu_4(OH)_6Cl_2 \cdot \frac{1}{2}H_2O$ The basic chloride of the foregoing Equation (2) precipitates and serves as the starting point for the preparation of other cupric compounds. It has the formula of the mineral atacamite and is referred to by that name hereinafter. By dissolving one fourth of the precipitated basic chloride in hydrochloric acid, and adding the resulting solution to the filtrate from the atacamite which contains only the ammonium chloride and a part of the cupric chloride of the original solution used to dissolve the copper, the original dissolving solution is restored ready for re-use. Instead of this procedure I may add an appropriate amount of hydrochloric acid to the solution of ammonium chloride and cupric chloride before or during its action on the metallic copper or before or during the air oxidation of the resulting cuprochloride solution. This addition of acid to the solution, prior to the treatment of the metallic copper therewith, to some extent accelerates the action of the cupric chloride on the copper. Of course, when hydrochloric acid is added to the ammonium chloride-cupric chloride solution, the filtrate from the basic copper chloride according to reaction (2) above is immediately ready for re-use for dissolving more copper, and the direct yield of the basic chloride is correspondingly reduced. In other words, instead of producing basic chloride according to Equations (1) and (2), and then dissolving one fourth of it in hydrochloric acid and returning it to the filtrate, the hydrochloric acid is added to the cupric chloride solution and the corresponding quantity of basic chloride is not precipitated.

Cupric basic carbonates may be made by direct interaction of the basic chloride (atacamite) with soda ash, although it is preferred to first partially or completely neutralize the basic chloride with hydrochloric or sulfuric acid and then treat it with sodium carbonate (soda ash).

Black cupric oxid is best prepared by decomposition of the basic carbonate. The black hydroxide $CuO \cdot H_2O$ may be prepared by simply heating the atacamite with any soluble base at 70° to 100° C. The blue hydroxide $CuO \cdot 3H_2O$ is prepared by treating the atacamite with alkali metal or calcium hydroxide at room temperature or below. The reactions are quantitative and both hydroxides filter with great ease.

In the manufacture of cupric acetate and basic acetate it is desirable to dissolve the blue hydroxide in acetic acid because the black hydroxide is much less reactive with weak acids and dissolves only slowly in acetic acid.

Cupric chloride may, of course, be produced by simply dissolving the atacamite in hydrochloric acid. The atacamite may be used as such for the preparation of Bordeaux mixture by treating it with one fourth of its chemical equivalent of lime and adding calcium sulfate in the same proportion as would be produced by treating copper sulfate with lime in the customary method of making Bordeaux mixture.

The atacamite is an excellent starting material for the manufacture of bluestone (copper sulfate pentahydrate). It may be prepared in two ways: (1) The atacamite is treated with limewater and the resulting blue or black cupric hydroxide filtered out and dissolved in sulfuric acid, or (2) the atacamite is treated directly with three fourths its equivalent of sulfuric acid and the resulting cupric sulfate and cupric chloride separated by fractional crystallization. In the latter method the bluestone may be crystallized out leaving the cupric chloride in solution and washed with a little water to remove adhering cupric chloride. The cupric chloride so produced may be returned to the process for use in dissolving more copper, being exactly sufficient to restore the mother liquor from which the atacamite is separated to its original composition.

The reactions involved in the above described methods of making bluestone from atacamite are as follows:

$Cu_4(OH)_6Cl_2 + Ca(OH)_2 \rightarrow 4Cu(OH)_2 + CaCl_2$
$4Cu(OH)_2 + 4H_2SO_4 + H_2O \rightarrow 4CuSO_4 \cdot 5H_2O$
$Cu_4(OH)_6Cl_2 + 3H_2SO_4 + H_2O \rightarrow$
    $CuCl_2 + 3CuSO_4 \cdot 5H_2O$ It is noted that in the procedure represented by the last equation above consumes only metallic copper, sulfuric acid, atmospheric oxygen and water and the reactions involved are quick and otherwise satisfactory for commercial utilization.

The preferred procedure for the production of bluestone from atacamite is to mix the atacamite, sulfuric acid and water in the following proportions:

|  | Parts by weight |
|---|---|
| Atacamite | 435 |
| Sulfuric acid (66° Bé.) | 640 |
| Water | 1250 |

This mixture heats due to the heat of reaction and may reach boiling temperature if the reaction is carried out on a large scale. On cooling the bluestone crystals are deposited, the mass becoming semi-solid.

From the foregoing it will be understood that my invention resides primarily in the oxidation of metallic copper by means of cupric chloride in the presence of another soluble chloride capable of forming a soluble double salt with cuprous chloride and more particularly in the use of ammonium chloride for this purpose. The invention resides further in the oxidation of cuprous compounds to cupric compounds by means of oxygen in the presence of an ammonium salt and particularly the oxidation of cuprous chloride to cupric chloride and cupric oxychloride in the presence of ammonium chloride. Further features of my invention are the direct production of cuprous compounds by precipitation thereof from a solution of a soluble double salt of a soluble chloride and cuprous chloride and the direct production of copper acetates by interaction of blue copper hydroxide with acetic acid.

I claim:

1. Process for the production of copper compounds from metallic copper which comprises treating metallic copper with a solution consisting essentially of water, cupric chloride and ammonium chloride.

2. Process as defined in claim 1 in which the solution contains hydrochloric acid.

3. Process as defined in claim 1 in which the solution contains 25% by weight of ammonium chloride and 8-10% by weight of cupric chloride dihydrate.

4. Process as defined in claim 1 in which the solution is maintained at an elevated temperature.

5. Process for the preparation of cupric compounds which comprises contacting oxygen with a solution of a cuprous compound in the presence of a soluble ammonium compound.

6. Process for the preparation of cupric compounds which comprises contacting oxygen with a solution of an ammonium cuprochloride.

7. Process for the preparation of copper compounds from metallic copper which comprises dissolving metallic copper in a solution consisting essentially of water, cupric chloride and ammonium chloride, subjecting the resulting solution to oxidation with oxygen, and separating the resulting basic cupric chloride.

8. Process as defined in claim 7 in which the solution contains hydrochloric acid and in which the mother liquor separated from the basic cupric chloride is used to dissolve more metallic copper.

9. Process as defined in claim 7 in which a portion of the basic cupric chloride is dissolved in hydrochloric acid and the resulting solution added to the mother liquor to produce a solution capable of re-use for dissolving more metallic copper.

10. Process for the preparation of bluestone which comprises contacting metallic copper with a solution of cupric chloride in the presence of ammonium chloride, oxidizing the resulting double salt to the formation of basic cupric chloride, treating the basic cupric chloride with lime to the formation of cupric hydroxide, and dissolving the cupric hydroxide in sulfuric acid.

LEO P. CURTIN.